United States Patent [19]

Reed et al.

[11] Patent Number: 5,274,566
[45] Date of Patent: Dec. 28, 1993

[54] ALIGNING AVERAGE AXIS OF HOLLOW WORKPIECE CAVITY WITH ROTARY MACHINE AXIS

[75] Inventors: Robert W. Reed, South Windsor; Douglas A. Kartsen, Manchester; Stevan W. Akerley, Durham, all of Conn.

[73] Assignee: United Technologies Corporation, Hartford, Conn.

[21] Appl. No.: 985,995

[22] Filed: Dec. 4, 1992

[51] Int. Cl.$^5$ .............. G01M 1/00; G01M 1/34; B23B 1/00

[52] U.S. Cl. .............. 364/474.37; 364/474.34; 364/551.02; 73/461; 73/597; 82/903; 82/1.11

[58] Field of Search .............. 82/1.11, 170, 173, 903; 364/463, 474.34, 474.37, 551.02; 73/461, 597, 623

[56] References Cited

U.S. PATENT DOCUMENTS

| | | | |
|---|---|---|---|
| 3,866,829 | 2/1975 | Egawa et al. | 364/505 |
| 4,197,888 | 4/1980 | McGee et al. | 364/474.34 |
| 4,620,463 | 11/1986 | Horn et al. | 82/1.11 |
| 4,866,643 | 9/1989 | Dutler | 364/474.35 |
| 4,884,210 | 11/1989 | Blaimschein | 364/474.17 |
| 4,889,425 | 12/1989 | Edwards et al. | 364/525 |
| 4,942,611 | 7/1990 | Kunugi et al. | 364/474.34 |
| 4,964,071 | 10/1990 | Grosvenor | 364/551.02 |
| 5,009,103 | 4/1991 | Sato et al. | 364/563 |
| 5,208,763 | 5/1993 | Hong et al. | 364/551.02 |

FOREIGN PATENT DOCUMENTS 0273790 11/1989 Fed. Rep. of Germany ........ 82/903

*Primary Examiner*—William E. Terrell
*Attorney, Agent, or Firm*—Charles E. Sohl

[57] ABSTRACT

A computer (21) processes the time between ultrasonic echoes received at a transducer (19) indicative of the outer radius and wall thickness of a workpiece (10) by subtracting (69) the weighted average (80-90) wall thickness from the weighted average outer radius to generate an internal radius for a large number of points around a spiral slice of the workpiece. The internal radii and angles are converted (69) to x and y coordinates. The centroid (X, Y) of each slice of data indicating workpiece cavity internal radii is determined (71) as twice the summation of the x coordinates and twice the summation of the y coordinates of all of the datum points of the slice. The least squares fit (73) of the X coordinates of the centroids of all of the slices and the least squares fit (74) of the Y coordinates of the centroids of all of the slices are then used to determine the average axis of the cavity of the workpiece. The $\overline{X}$ and $\overline{Y}$ coordinates of the end points of the average axis of the cavity are then converted (75) to polar coordinates to permit offsetting the end points of the workpiece commensurate amounts, whereby further machining will cause the internal cavity of the workpiece to end up more nearly centrally located, on average.

7 Claims, 7 Drawing Sheets

ALIGNING AVERAGE AXIS OF HOLLOW WORKPIECE CAVITY WITH ROTARY MACHINE AXIS

TECHNICAL FIELD

This invention relates to determining the orientation of a nominal axis of a cavity within a hollow workpiece, and co-aligning it with the rotary axis of a machine.

BACKGROUND ART

In the machining of metal parts, there are configurations and operations which become quite difficult and result in less than ideal pieces, with some inadequate parts that must be thrown away, or with product lines that do not maximize desired operating characteristics as a consequence of the inability to improve the manufacturing processes. An example is hollow shafts used in modern gas turbine engines, such as those typically used on aircraft. In hollow engine shafts, it is common to have internal diameters along the central portions of the shaft which are larger than the internal diameters of the shaft near its ends. This means that the shafts cannot be produced by simply drilling the internal voids, but rather require more complex machining processes. In such process, a boring machine marketed under the tradename Alfing, utilizes solidified sulfur as a guide to a boring bar which is drawn through the area to be machined, thus "hogging" the material out of the part (the process is itself sometimes referred to as Alfing). This process is not very accurate and leaves internal surfaces which are not perfectly round and not perfectly centered along a straight line. On the other hand, the external surface of such a shaft must be perfectly centered, straight, round and smooth (within a few mils) in order to provide proper mating with the various other engine parts, and acceptable relative motion therewith.

The level of vibration in the operation of an engine resulting from uneven wall thicknesses at various points along the shaft can only be partially reduced through compensation. The only way to reduce gas turbine engine vibration as a consequence of its main shaft imbalance is to improve the machining process and thereby reduce the vibration which would occur prior to compensation therefor.

It is known to use the timing of ultrasonic echoes to determine characteristics and dimensions of workpieces being machined. Using ultrasound to measure surfaces of parts being machined is shown in U.S. Pat. No. 4,655,084. It is also known to communicate the ultrasonic pulses through fluids involved in machining processes. U.S. Pat. No. 4,272,924 discloses measuring the thickness between the upper and lower surfaces of glass workpieces which are being lapped with a lapping fluid, the ultrasonic wave communicating to the workpiece through the lapping fluid. Coupling the acoustic waves to the workpiece through a fluid is also shown in U.S. Pat. No. 4,976,149. However, none of these patents address, even remotely, any part of the foregoing problem.

DISCLOSURE OF INVENTION

Objects of the invention include provision of improved working of hollow workpieces, such as hollow shafts.

According to the present invention, the internal radius of many points along a hollow shaft are measured, and an average axis of the internal cavity of the hollow workpiece is thereafter co-aligned with the rotation axis of a workpiece-rotating machine tool for further working of the workpiece, in response to the measurement of the internal radii thereof.

In accordance further with the invention, the average axis of the internal cavity is taken to be that defined by the least squares fit of the X and Y coordinates of the centroids of a large number of nearly-lateral slices of the internal cavity. The end points of the average axis are converted to polar coordinates (a radius and an angle) and utilized to offset the ends of the workpiece from the machine rotation axis appropriately to cause the average axis of the internal cavity to be co-aligned with the rotary axis of the machine.

In accordance still further with the invention, the radii of the internal cavity are determined as the difference between the measured external surface radii and the measured wall thicknesses of a large number of points about a nearly lateral slice of the cavity, the radii are converted to x and y coordinates, and the X and Y coordinates of the centroids of each slice are determined as twice the summations of all the x and y coordinates of the radii of such slice, which is equivalent to the calculation of the center of mass of an arbitrary shape of uniform density and thickness.

The invention utilizes available ultrasonic technology for making accurate measurements of external radius and wall thickness, as a part of the process of the invention. The process of the invention requires only a small amount of time which is not prohibitive and therefore does not unduly increase the cost of parts made thereby. Use of the process of the invention permits creating hollow workpieces which have much more nearly uniform wall thicknesses and therefore are more easily balanced, capable of being balanced to a higher degree, and capable of reduced vibration over broader speed ranges than can pieces made in accordance with the prior art.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
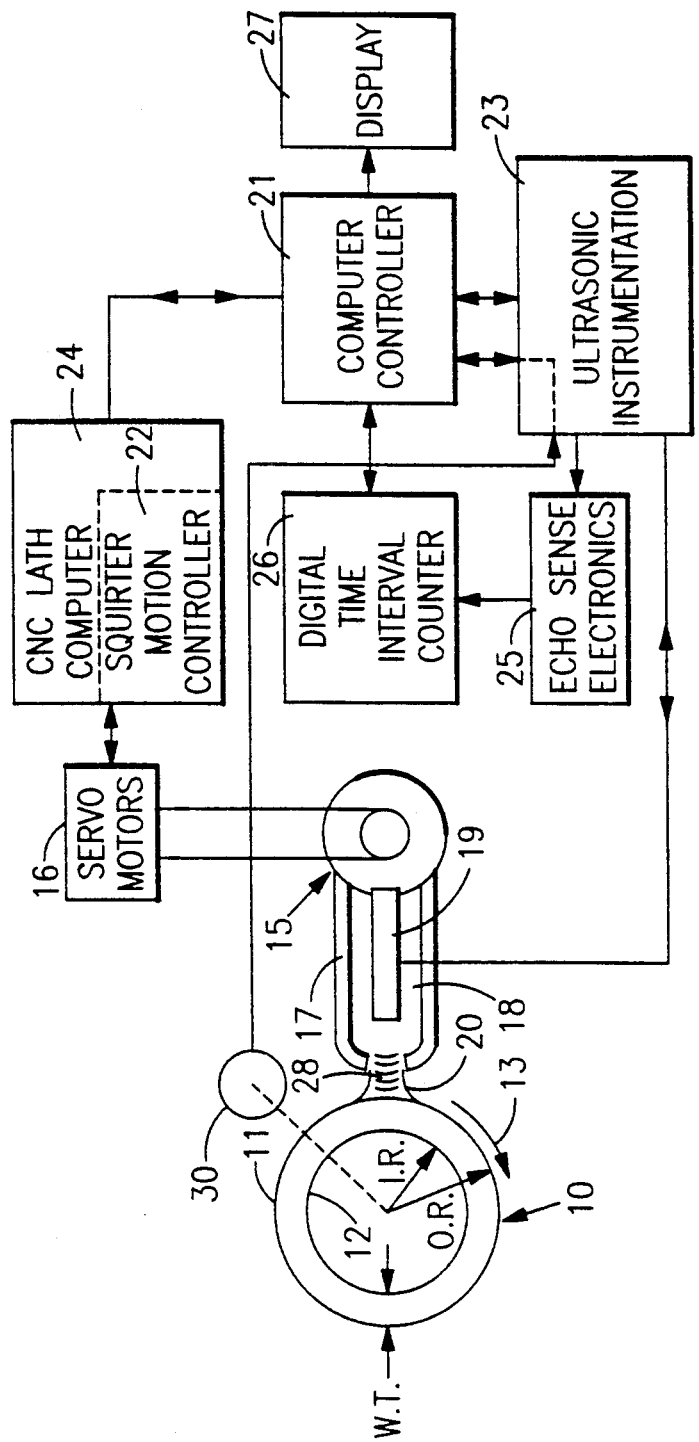
FIG. 1 is a combination of a simplified cross sectional view of a tubular workpiece and associated ultrasonic gauging equipment, in combination with a simplified block diagram of electronic circuitry for controlling the operation of and evaluating the data obtained from such equipment, according to the present invention.

Referring now to FIG. 1, a workpiece 10, which may be elongated in the direction normal to the plane of the drawing, is bounded radially outwardly by an external surface 11 and radially inwardly by an internal surface 12. An arrow 13 indicates that the workpiece 10 rotates clockwise; this workpiece motion, as well as workpiece motion normal to the figure are accomplished by resorting to mounting and rotating means that are completely conventional and are not shown. For illustrative purposes, the present invention is described as used in conjunction with machining of the workpiece 10 as it rotates on a lathe having tool holders for holding, inter alia, a stationary cutting tool (not shown), but it may be used with milling machines and other workpiece-rotating machines.

As illustrated, an ultrasonic unit 15 (sometimes referred to as a squirter) is mounted in a conventional tool holder (not shown) positioned by servomotors 16, which normally is used to position a cutting tool in a Computer Numerically Controlled (CNC) lathe, and includes, as its main components, a housing 17 bounding an internal passage 18, and a transducer 19 accommodated in the passage 18. The housing 17 is also used to squirt or otherwise direct a stream or jet 20 of a liquid medium, such as water, cutting oil, or other coolant, against the external surface 11 of the workpiece 10, which serves to transmit waves 26 having frequencies in the ultrasonic range between the transducer 19 and the workpiece 10.

A computer controller 21 communicates with the computer 24 of the CNC lathe which rotates the workpiece, such as by means of an RS232 serial data link. The CNC lathe computer 24 includes tool motion control functions that, through the servomotors 16, control the motion of a tool holder on which the ultrasonic unit 15 is mounted; this is sometimes referred to in the prior art as a squirter motion controller 22. The CNC computer treats the squirter as a cutting tool, offset from the surface of the workpiece, and advances it along the workpiece. The data in the CNC computer 24 concerning the workpiece are also supplied to the computer controller 21, and used to set up the ultrasonic instrumentation 23. The computer controller 21 is typically a desk top computer, but its functions may be provided by any suitable computer, such as the CNC computer if appropriate, in any given implementation of the invention. This is accomplished in a way that is entirely conventional and thus is not discussed here. Moreover, the computer controller 21 also issues additional control signals that control the operation of ultrasonic instrumentation 23, which causes the transducer 19 to issue the series of ultrasonic pulses 28 at frequencies in the range of 1 to 25 MHz. The ultrasonic waves first propagate through the liquid medium stream 20 toward the external surface 11 of the workpiece 10 and then penetrate into the workpiece 10 to eventually reach the internal surface 12.

Inasmuch as the surfaces 11 and 12 constitute discontinuities (i.e. interfaces between materials exhibiting different wave propagation characteristics) in the propagation path of the ultrasonic waves, respective first and second echoes are reflected therefrom to the transducer 19 which converts them into respective electrical signals which have substantially the same waveforms as the returned ultrasonic echoes.

The ultrasonic instrumentation 23 provides the electrical signals to echo sense electronics 25 which starts or triggers a digital time interval counter 26 in response to the first signal, and stops the latter in response to the second signal. The information collected by the time interval counter (i.e. the indication of the time interval elapsed between the first and second signals and hence between the return of the first and second echoes) is fed to the computer controller 21 which may issue display signals in response thereto to a display 27 of any conventional construction, to present human-readable information. The signals are also stored for future use as described infra.

The thickness measurement accuracy is critically dependent on the exactitude of the determination of the time period elapsed between the returns of the first and second echoes which, in turn, is dependent on the precision with which the time interval between the aforementioned first and second signals is determined. The accuracy is improved by making the time interval measurement much less sensitive to variations in ultrasonic signal amplitude variations by using constant fraction discriminator circuits (CFDs), of the type shown generally in U.S. Pat. No. 4,153,666, to sense the arrival of the echoes used for the timing measurements. It has been established that, when a CFD is properly set up, it dramatically reduces the trigger time uncertainty for a pulse amplitude range of 20 dB or more, from on the order of ten or more nanoseconds to about one third nanosecond, depending on the signal-to-noise ratio of the input signal. The CFD operates by delaying the pulse of interest by a time interval approximately equal to the pulse rise time, thus forming a time-delayed replica of the original pulse, and then comparing the thus formed pulse replica with the undelayed pulse. The trigger pulse is generated when the undelayed and delayed pulses cross each other (i.e., when their amplitudes are at the same level for the first time). Since both the original pulse and its replica change in amplitude together, the crossover point remains stable in time for amplitude changes of up to 40 dB. The stable trigger pulses, generated by two constant fraction discriminator circuits operating on two ultrasonic echoes, are then used to start and stop the time interval counter to make an accurate measurement of the time interval in question. One implementation of the above approach and a more detailed representation of the ultrasonic and time interval measuring apparatus is illustrated in Reed et al, "Ultrasonic Sensing for In-Process Controls of Turning", Wright Research Development Center Technical Report 90-8036, Feb. 28, 1991, and in U.S. patent application Ser. No. 07/556,604, filed Jul. 20, 1990, now abandoned, both incorporated herein by reference.

Prior to its use to gauge the workpiece 10, the system should be calibrated using calibration blocks made of the same material as the workpiece. The apparatus of FIG. 1 is preferably initially used to calibrate the system by aiming the transducer 19 (FIG. 1) at a calibration block made of the material of interest of precisely known dimensions and at a precisely known distance from the transducer. The calibration operation measures the velocity of sound in the material and sets the receiver gain for amplifiers used on the two echoes and generates gate signals for arming the CFDs.

The signals of ultrasonic instrumentation 23 are synchronized with the relative movement between the workpiece 10 and the transducer 19, such as, in the case of a cylindrical workpiece 10 mounted on a lathe (or other rotary machine), with a conventional optical rotary encoder 30 issuing trigger signals indicative of the angular position of the lathe drive shaft, such as 1000 pulses per revolution, as well as another pulse once per revolution. Hence, all of the ultrasonic thickness or distance data that is obtained is correlated with specific locations of the workpiece 10. The aforementioned trigger signals cause the transducer 19 to emit corresponding ultrasonic waves 28 (pulses) toward the workpiece 10 and are used to gate the returning echoes.

The computer controller 21 and display 27 may be a Hewlett Packard (HP) Model 360, which provides all data processing, image generation, and a continuous updated display of thickness statistics. The ultrasonic instrumentation 23 may be based on two MATEC MBS 8000 bin systems. The time interval counter 26 may be an HP Model 5370B time interval counter which can provide up to 6000 time interval measurements per second with single shot resolution of 25 ps. The echo sense electronics 25 includes a pair of CFDs (hereinbefore) and provides a timing pulse to the counter 26 that is referenced to the peak of the echoes used to start and stop the counter 26.

The two MATEC MBS 8000 bin systems used for generating and receiving the ultrasound may be fully computer controlled via an IEEE 488 bus. However, respective gated peak detector (GPD) modules in the bin systems are preferably modified to provide dual peak detectors, each capable of reading a peak value within a single sample, to present peak detected amplitudes as analog signals to the computer controller 21 via a 16 channel A/D converter card, resident in the HP 360 computer, manufactured by Infotek Systems.

The transducer 15 may be a 10 or 15 MHz, unfocused, transducer. The measurements may be taken at 500 data points in the circumferential direction and 500 circumferential data sets (separated by 0.01 inch) along the axial direction. The wall thickness data typically has a resolution of 0.0001 inch and an accuracy of 0.0002 inch.

Figure 2:
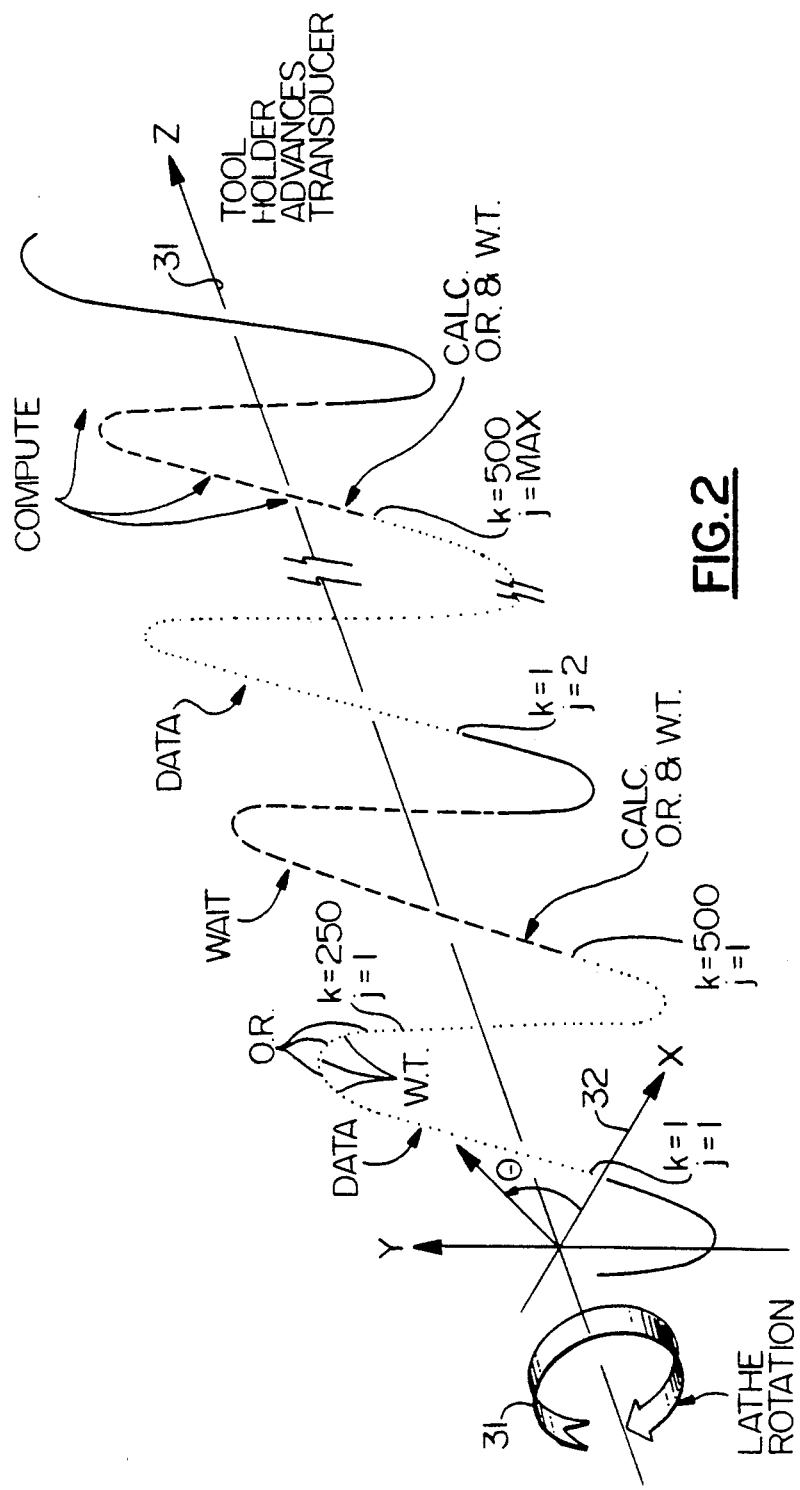
FIG. 2 is a stylized representation of the manner in which data is acquired and calculations are made therefrom in interleaved cycles.

Referring now to FIG. 2, a workpiece is rotated within a lathe or other rotary tool in a direction indicated by an arrow 30, at about 250 revolutions per minute. The ultrasonic unit 15, (FIG. 1), mounted in the tool holder, is advanced in the z direction along a line parallel to the axis 31 of the lathe or other rotary tool. As a result of these two motions, the locus of the intersection of the radii of the workpiece 10 with the surface thereof upon which the ultrasonic pulses 26 impinge, is a spiral. The rotary encoder referred to hereinbefore provides 1,000 pulses per revolution, of which every other pulse is utilized to measure outside radius (O.R.), and the interleaved pulses are utilized to measure wall thickness (W.T.), as a consequence of having set the gates, for the time windows within which return pulses can be received, to correspond to the approximate dimensions indicated by the computer numerical control information provided to the computer controller 21 and thus to the ultrasonic instrumentation 23. There will actually be responses from 1,000 different radii circumventing the workpiece within each revolution of the workpiece, but since these are related to each other in pairs corresponding to a single site, there are 500 pairs related to each successive longitudinally displaced position (z) along the shaft; each pair herein is related to one of the sites at adjacent angles $\theta$, by a value of k. The locus of the sites comprise single turn spirals (dotted lines, FIG. 2) separated by a distance equal to their length (dash lines, FIG. 2). The rotary encoder also provides one signal that appears once per revolution, used to define the positive x axis 32, by means of which each complete revolution (either a data set collection spiral or a calculation/wait spiral) is demarcated, and each being referred to by a corresponding value of k. Although the related pairs of measurements of outside radius and wall thickness are not taken at exactly the same point in each site about the workpiece, they are close enough so that variations in either are below machine tolerances and are therefore meaningful. In addition, each measured value of outside radius and wall thickness may be combined with those taken before it and after it in a weighted average so as to mitigate the effects of anomalies and noise, in a manner illustrated briefly and described with respect to FIG. 8 hereinafter. Therein, for the second cycle as an example, the value of the fifth datum (k=5) is shown to be averaged with three quarters of the value of the fourth and sixth datums, half the value of the third and seventh datums and one-quarter of the value of the second and eighth datums. This is true of both the measured values of wall thickness and the measured values of outside radius, as is described more fully hereinafter. The value of j identifies successive sets, or slices, longitudinally displaced along the workpiece. In a typical aircraft engine hollow shaft, j max may be on the order of 500 positions along a 50 inch portion of a shaft, although that can vary considerably from one application to the next.

The purpose of collecting the information on the fly is to reduce the amount of time it takes to process a workpiece utilizing the invention. Additionally, taking the outside radius and wall thickness measurements in an interleaved fashion permits very simple electronic gating of the return pulses and proper identification of them. By collecting data in one revolution and not collecting data in a subsequent revolution, followed by collecting and not collecting in a subsequent pair of revolutions, the encoder need not be an absolute encoder, but can be simply a tachometer or incremental encoder, utilizing the once per revolution signal to separate each spiral set (slice) of data collection from the next, thereby to avoid getting the information out of synch. In this way, pairs of data points, one for outside diameter and one for wall thickness, can be stored in two-dimensional data arrays, the addresses of which correspond to known values of $\theta$ and j.

Figure 3:
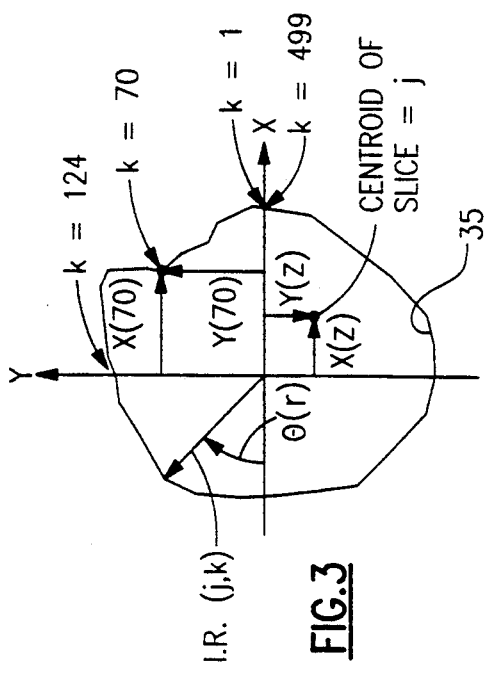
FIG. 3 is a graph of variations in the inner diameter of a cavity at a particular, nearly normal slice along a workpiece.
Figure 4:
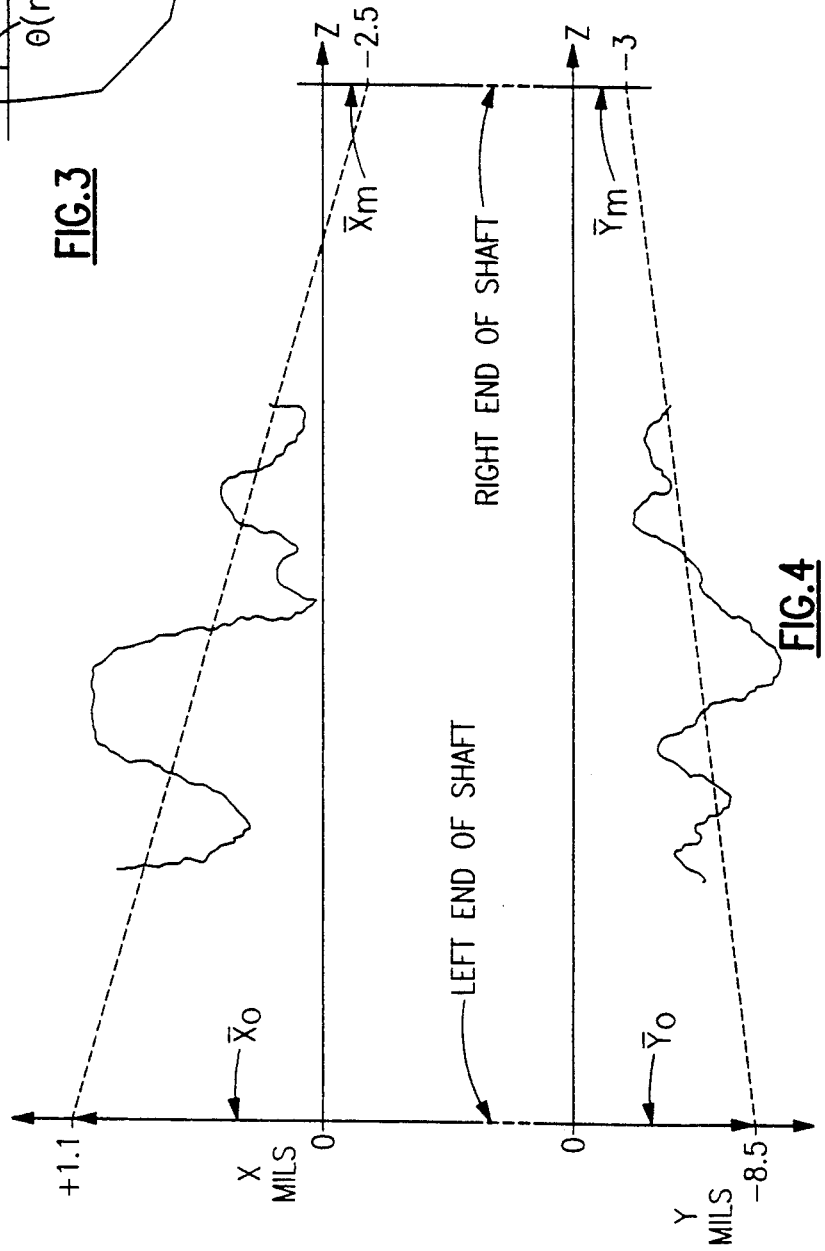
FIG. 4 is a graph illustrating the least squares fit of a line to the X coordinates and of a line to the Y coordinates of the centroid of the inner radii of a nearly normal slice of a cavity of the workpiece in accordance with the invention.

Referring as well to FIG. 3, a plot 35 of variation of inside radius for a spiral data slice is shown in a single xy plane; it should be borne in mind that it actually represents a spiral, where k=1 would be above the plane of the paper and k=250 (half way around) would be behind the plane of the paper. The variations in radius in the plot of FIG. 3 range between about 2.5333 inches and 2.537 inches (the scale does not approach zero). For each of 500 values of k, a value of wall thickness (W.T.) and of inside radius (I.R.) are stored. After averaging, each of these points are converted to x and y coordinates (as shown for k=70) as a function of the angle of rotation of the workpiece ($\theta$) which corresponds to each value of k (0.72° per datum point k). Then, for each slice (each value of j) all of the x's and y's in the slice are combined to find the centroid of the slice according to the relationships: X equals twice the summation of all the x's in the set for that slice; and Y equals twice the summation of all the y's in the set for that slice. This can be shown to be equivalent to calculating the center of mass of an arbitrary shape of uniform density and thickness, which is referred to as herein as the centroid of the area circumscribed by the data points. These are stored slice by slice, for successive values of j until jmax=N (which may be around 500) is reached. Then, a least squares fit of all the values of X and a least squares fit of all the values of Y are taken as illustrated in FIG. 4. The method of determining the least squares fit illustrated in FIG. 4 is well known and is set forth in W. H. Press et al, "*Numerical Recipes,* Cambridge University Press, New York, N.Y. 10022, 1986, Chapter 14. The result of the least squares fit of the values of X is a line described by the formula $X = Xo + kz$, which may become negative as illustrated in FIG. 4; the definition of the least squares fit line of all of the Y's is similar. Together, these define the average axis of the cavity (represented by all the inner radii which have been measured and calculated) referenced to the rotary axis of the lathe or other workpiece-rotating machine tool. The workpiece is offset at each end by $-\bar{X}o$, $-\bar{Y}o$, (for values of z equal to 0) and $-\bar{X}m$, $-\bar{Y}m$ (for values of z equal to the maximum value), to have the average axis of its cavity aligned with the rotary axis of the machine tool, which is the one object of the invention. FIG. 4 illustrates that data may be processed for a cavity which extends for only a portion of the workpiece, but the lines determined therefrom by least squares fitting are extended to the ends of the workpiece to find the required offsets for coaligning the cavity and machine axes. Further machining of the workpiece will cause the wall thickness to become more uniform. This permits much better balancing, including easier balancing and balancing which is effective at more rotary speeds, and/or other advantages, depending on how the invention is used.

An overall, macro statement of the an exemplary embodiment of the processes involved in practicing the invention is set forth in Table 1.

TABLE 1

1. Mount workpiece; load CNC data; initialize all equipment; and calibrate ultrasonics; align ultrasonic transducer to lathe and workpiece.
2. Measure (and weighted-average, if desired) the outer radius (O.R.) and the wall thickness (W.T.) along the length of the shaft using ultrasonic echo processing, for 500 sites around each of about 500 (or more) slices of the shaft along its length.
3. Calculate the internal radius (I.R.) with respect to the lathe axis along the length of the shaft: I.R. = O.R. − W.T., for each site.
4. Convert each of the 500 I.R.s per slice to 500 xy coordinates of the internal points per slice.
5. For each slice, find the centroid X, Y coordinate as X = twice the summation of x's and Y = twice the summation of y's.
6. Find the least squares fit of a line to all the X's along the cavity and the least squares fit of a line to all the Y's along the cavity.
7. Find the end points of the lines of paragraph 6 as Xo, Yo and Xmax, Ymax of the average center line (A.C.L.) of the internal cavity of the shaft, and convert to vector coordinates.
8. Coalign the A.C.L. with the lathe axis by offsetting the position of the shaft on the lathe at each end to the vector coordinates of paragraph 7.

TABLE 1-continued

9. Work the exterior of the shaft to desired outside radius and finish.

Figure 5:
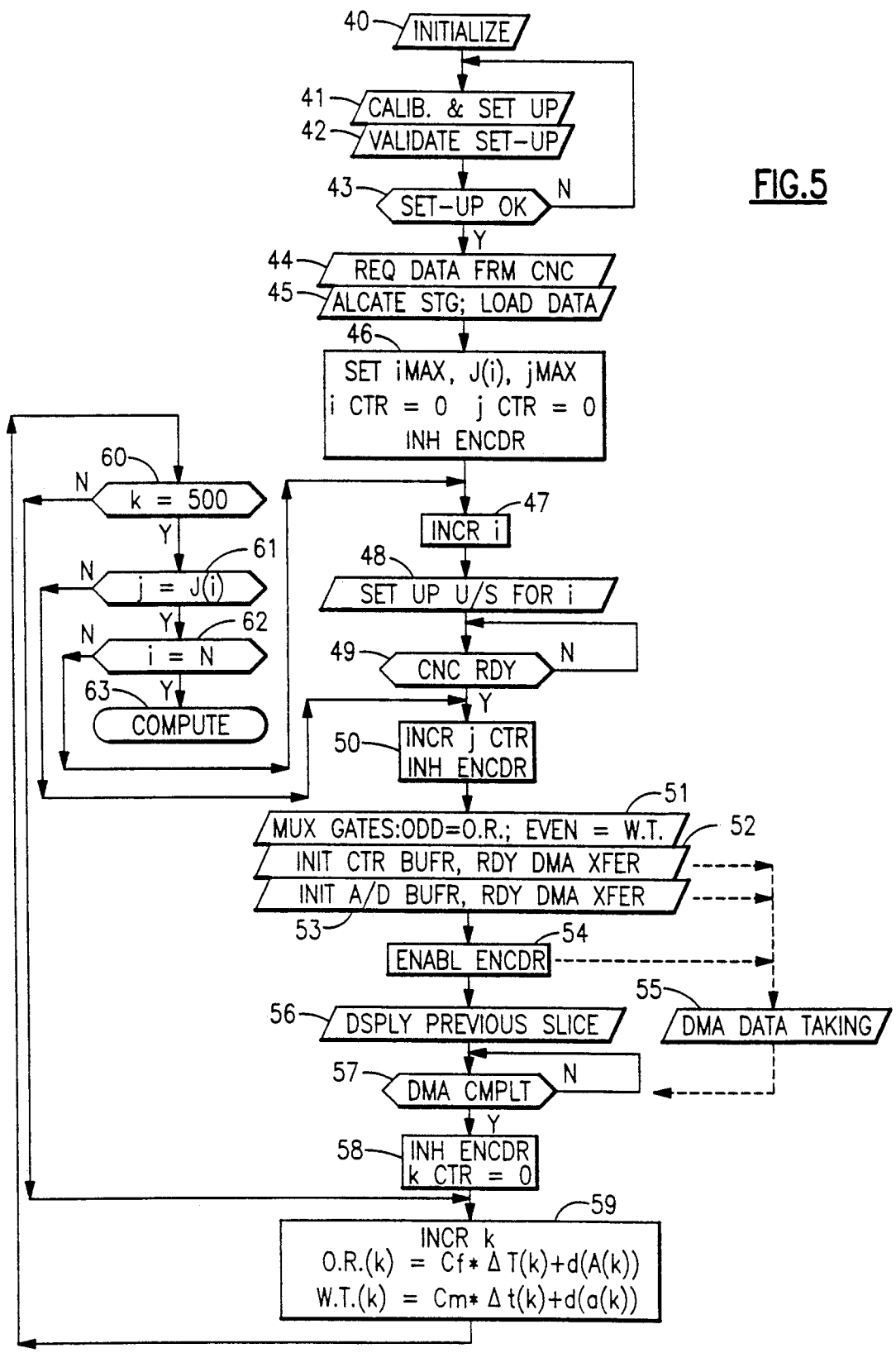
FIG. 5 is a simplified logic flow diagram of data collection in accordance with the present invention.

Referring now to FIG. 5, a simplified logic flow diagram of the program within the computer controller 21 begins with the normal power up initialization subroutine 40. Then a subroutine 41 (which in fact may be several different subroutines with significant operator interaction) will provide calibration and setup of the associated equipment 23, 25, 26 (FIG. 1), and a subroutine 42 checks the setup flags to validate that setup has occurred properly; if it has not, a negative result of a step 43 will cause the program to revert to the subroutine 41 to repeat the process. If setup has proceeded properly, an affirmative result of the test 43 will reach a subroutine 44 which causes data relating to the shaft or other hollow workpiece to be requested from the CNC lathe computer 24, over the RS 232 data link. Then, a subroutine 45 allocates various storage space such as data arrays and disk space, and stores parameters related to the shaft to be worked upon, including squirter position parameters for each section of the shaft. A hollow shaft utilized in a jet engine may typically have three or four sections of differing diameters, or of differing wall thicknesses. For each section, the ultrasonic unit 15 is very accurately positioned with respect to the outer radius of the workpiece at its position along the length of the shaft, thereby establishing with certainty the time at which the response from the outer surface of the shaft should be received, for purposes of setting gates in the receivers that respond to the echoes from the workpiece. The data from the CNC lathe computer 24 also provides the nominal wall thickness for each section, so that the gates can be set appropriately. The length of each section is indicative of the value of J, which is jmax for the section. In the subroutine 45, appropriately sized data storage arrays are allocated to receive all of the ultrasonic data from the shaft. The descriptive parameters specifically include: the z-axis starting and stopping positions, the x axis squirter position, the nominal wall thickness, and the number of slices along the z axis for each section of the shaft. The number of data points to be taken about the circumference of each slice can be adjusted, but in this embodiment it is fixed at 1,000 data points for each slice. The lathe spindle speed can also be stored for future analysis of the information which is derived by the ultrasonic measurements.

When all is in readiness, a series of steps 46 set a value indicative of imax, which is the number of sections of varying diameter or wall thickness in the shaft; the number of slices, J, in each section; the total number of slices in the entire shaft, jmax, which equals the summation of J's across all of the sections; a counter which keeps track of the number of sections in the processing, i CTR, is set to zero; a counter which keeps track of the number of slices in the processing, j CTR, is set equal to zero; and the trigger signals from the encoder 20 are inhibited. This prevents data from being taken until all else is in readiness. Then, processing begins by incrementing i to point to the first section, in a step 47, and a subroutine 48 sets up the ultrasonic system for the measurements established in the section identified by i. This includes establishing the timing of the gates for echoes from a size and thickness range appropriate to the section of the shaft being measured. The gains of the ultrasonic system are automatically optimized at this point. The computer waits at a test 49 for the numerical controller to indicate, by sending a signal on the RSR 232, that the beginning of the first section has been reached by the tool holder which is moving the ultrasonic unit 15. When the beginning of the first section is reached, a ready signal from the CNC lathe computer 24 causes an affirmative result of a test 49 to reach a pair of steps 50 in which the j counter is incremented so as to point to the first slice of the shaft and the encoders are inhibited (redundantly, in the case of the first pass through this subroutine). The encoder triggers are inhibited in the steps 46 to prevent taking data until the beginning of the first section as indicated by the test 49; the encoder triggers are inhibited in the step 50 to prevent taking data in alternative slices (the dash lines of FIG. 2). In subroutine 51 the multiplexer input to the time interval counter is set up to: first, and in response to every odd trigger pulse from the shaft angle encoder, send outside diameter time interval data to the time interval counter; and then, and in response to every even trigger pulse from the shaft angle encoder, send wall thickness data to the time interval counter. Then, in a subroutine 52, a data buffer for receiving data from the counter via a direct memory access transfer on an IEEE-488 data bus is initialized and readied. And in a subroutine 53, the analog to digital (A/D) converter card is set to receive data indicating the amplitude of the echoes from the front surface and back surface (as well as flaw echoes within the material of the shaft, if desired) via a DMA transfer, to an appropriately sized buffer storage. Now, the system is ready to process the ultrasonic data.

A step 54 enables the encoder triggers to pulse the ultrasonic transducer and to activate the DMA data transfers to record the ultrasonic echo responses. This will cause 500 counts indicative of outside radius interleaved with 500 counts indicative of wall thickness to be recorded. With the lathe turning at 250 rpm, it will take about 0.24 seconds for completion of the DMA data taking routine 55. If desired, the system may be set up to display wall thickness and outside radius (or diameter) of the next previous slice (except during the first slice) by means of a suitable subroutine 56. However, this is not part of the present invention and is not required.

The main program of the computer controller 21, illustrated in FIG. 5, waits at a test 57 for completion of the DMA data taking routine 55. When the DMA data transfers are complete, an affirmative result of the test 57 will reach a step 58 where the encoder triggers are again inhibited and where a factor, k, utilized to keep track of each site (each related pair of outside radius and wall thickness measurement, and related parameters), is initialized at zero. Then it is incremented in a group of steps 59 so as to point to the first site. And then the outside radius and wall thickness dimension for that site are calculated from the time interval data which the DMA data taking has acquired, indicative of the parameters of the shaft at that slice. The outside radius for site k is calculated as some constant Cf, which is related to the speed of sound in the fluid used in the squirter times the time interval $\Delta T$, between the launching of the pulse and the first echo (which is from the outside surface of the shaft measured for the kth site) plus a distance adjustment, d, relating to the amplitude, A, of the return signal from the outside surface of the shaft at that site. This distance correction is determined by table lookup utilizing the amplitude, A, of the return pulse as the argument (or address). The lookup table is established empirically for the apparatus during the calibration and setup routines 41. The relationship between a distance correction, d, and the amplitude, A, is established utilizing an echo from a known calibration distance, and adjusting the gain of the receivers to various amplitudes, and determining the apparent distances, and therefore the errors, which result from variations in the gain. While this improves the accuracy and is recommended when accuracy to a fraction of a mil is required, the invention can be practiced without employing the amplitude distance correction. The final one of the steps 59 similarly calculates wall thickness for the kth site utilizing a constant, Cm, related to the speed of sound in the material of the workpiece, times the time interval, $\Delta t$, between receipt of the echo from the outside surface of the workpiece to receipt of the echo from the inside surface of the workpiece, plus two corrective distances, d1 and d2, determined from the lookup table, utilizing the amplitudes, a1 and a2, of the two wall thickness echoes as arguments. Then a test 60 determines if all 500 sites have had outside radius and wall thickness calculated, or not. Initially, they will not have, and a negative result of the test 60 will revert to the steps 59 to increment k to point to the next site, and to calculate the outside radius and wall thickness for that site. This continues until all of the sites have had outside radius and wall thickness calculated. It is the result of the steps 59 which may be displayed by the subroutine 56 while data for the next subsequent slice is being gathered, as described hereinbefore. Eventually, the outside radius and wall thickness of the entire slice are calculated and an affirmative result of the test 60 will reach a test 61 to determine whether the current slice, j, is the highest numbered (end) slice, J, for the current section, i. Initially it will not be, so a negative result of test 61 will cause the program to revert to the steps 50 so as to accommodate the data taking for the second slice of the section. When all of the slices in a given section have had the outside radius and wall thickness measurements and calculations completed, an affirmative result of the test 61 will reach a test 62 which determines if the section which just has been completed is the last section, n, in the shaft being worked upon. If not, a negative result of the test 62 will cause the program to revert to the step 47 where i is incremented to identify the next section along the shaft (there being three or four different sections in a typical aircraft engine shaft), and the steps, tests and subroutines 48-62 are repeated once again. When all sections of the shaft have had the outside radius and wall thickness measured and calculated, an affirmative result of test 62 will reach a compute subroutine of FIG. 6 through a transfer point 63.

Figure 6:
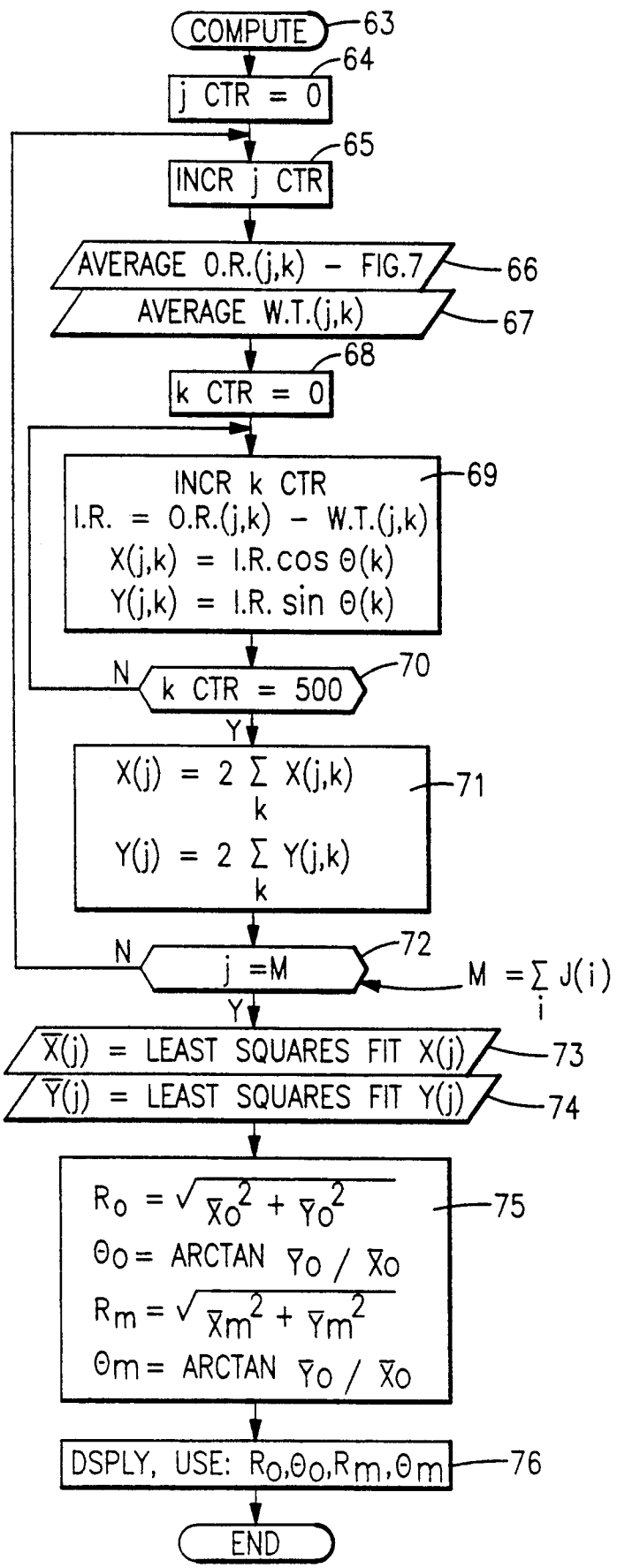
FIG. 6 is a logic flow diagram of calculations in accordance with the present invention.

In FIG. 6, a first step 64 sets the j counter, which is used to keep track of slices, to zero. Then a step 65 will increment the j counter to point to the first slice of all the slices in all the sections of the shaft. Then a subroutine 66 averages the outside radius data for each site, k, in slice j, in a manner described with respect to FIGS. 7 and 8 hereinafter. While it is preferable to provide weighted averaging of the data values so as to mitigate the effects of anomalies and noise, it need not be done in the manner described with respect to FIGS. 7 and 8 hereinafter, and if appropriate in certain circumstances, averaging may be eliminated altogether. In a subroutine 67 the wall thickness data for each of the sites, k, in slice j, is also averaged, in the manner to be described with respect to FIGS. 7 and 8 hereinafter. Then, a counter which keeps track of the sites in the various slices, k CTR, is initialized at zero at a step 68. A plurality of steps 69 increment the k counter to point to the first site, and a temporary internal radius factor, I.R., is set equal to the difference between the outside radius for that site and the wall thickness for that site. Then the x and y coordinates of the site, which depend on the internal radius and the angle $\theta$ relative to the x axis (FIG. 2) are calculated in accordance with the well-known cosine and sine relationships. A test 70 determines if all sites of the present slice have had their x and y coordinates calculated or not; initially, they will not have, so a negative result of test 70 will cause the program to revert to the steps 69 to increment the k counter to point to the next site of the slice and calculate the internal radius and the x and y coordinates thereof. When all the sites of the present slice have had their x and y coordinates calculated, an affirmative result of the test 70 will reach a pair of steps 71 where coordinates X, Y of the centroid of the slice (FIG. 3) are calculated as twice the summation of the x coordinates of each site and twice the summation of the y coordinates of each site. This can be shown mathematically to be equivalent to calculating the center of mass of an arbitrary shape of uniform density and thickness, which is referred to herein as the centroid of the area circumscribed (35, FIG. 3) by the data points. After the coordinates of the centroid of each slice has been determined in the steps 71, the test 72 determines if these coordinates have been computed for all the slices, M, in the shaft, M, which is equal to the summation of the number of slices, j, in each of the sections of the shaft. If not, a negative result of the test 72 will cause the program to revert to the step 65 where the j counter is incremented to point to the next slice, and the averaging (if desired) is again performed, the coordinates of each site are determined, and the coordinates of the centroid are computed. When the coordinates of the centroids of all of the slices in the entire shaft have been computed, a pair of subroutines 73, 74 compute a formula for $\overline{X}(z)$ which equals the least squares fit to all the values of X's which were stored in the steps 71 and a formula for $\overline{Y}(z)$ which equals the least squares fit to all the values of Y's which were stored. The least squares fit may be performed as described in W. H. Press et al, *"Numerical Recipes"*, Cambridge University Press, New York, N.Y. 10022, 1986, Chapter 14. This provides the equations defining the cavity axis, as illustrated by the two lines in FIG. 4. By letting z equal zero, the values of $\overline{X}o$ and $\overline{Y}o$ are determined, and by letting z equal zmax, the values of $\overline{X}m$ and $\overline{Y}m$ are determined. These values of $\overline{X}$ and $\overline{Y}$ are converted in steps 75 into polar coordinates representing the distances that the ends of the workpiece should be offset from the lathe axis and the particular lathe angles $\theta$ at which the offset should occur at each end of the shaft. Then, in the final steps 76 of the process, the values of the R's and $\theta$'s can be displayed and used to position the end points of the shaft with respect to the machine axis so as to co-align the average axis of the cavity in the workpiece with the axis of the lathe or other machine tool, and the workpiece can be reworked.

In the most primitive utilization of the present invention, the workpiece can be shimmed so as to achieve the offset opposite to that indicated by the values of Ro, $\theta$o, Rm and $\theta$m (that is, displaced 180° from $\theta$o and $\theta$m, respectively) determined in the step 75, so that further machining will correct the offset. However, it is extremely difficult to achieve accurate shimming in normal chucks and workstocks. It is preferable to utilize headstocks and footstocks which have offsetting capability provided therein, which may simply be of the same nature as adjustable offset boring fixtures. Adjustable offset boring fixtures of this type are disclosed in U.S. Pat. No. 2,780,467. Headstocks and footstocks employing such adjustable offset boring fixtures are manufactured by Grosite Industries, New Britain Avenue, Farmington, Conn.

Figure 7:
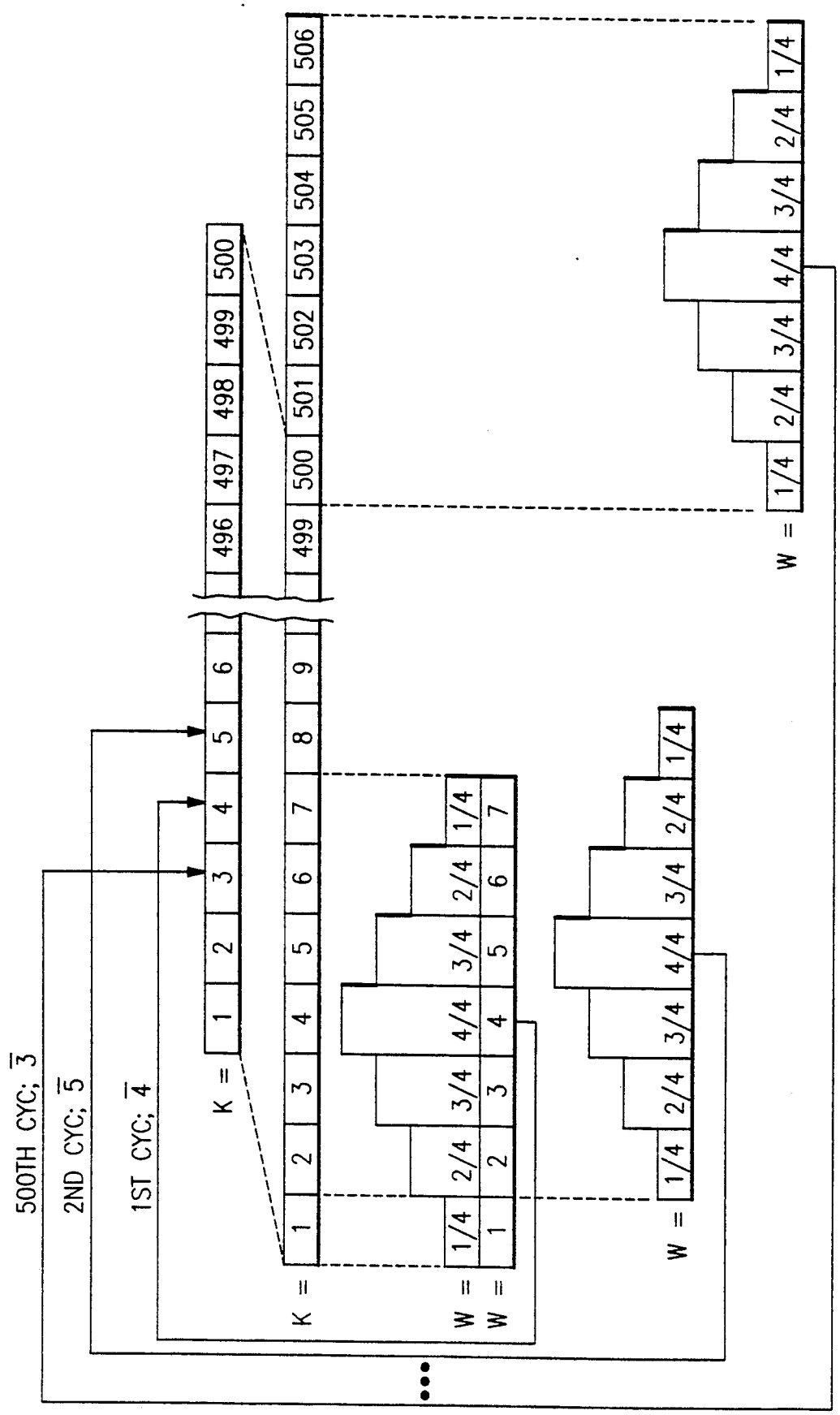
FIG. 7 is a simplified illustration of averaging which may be used, if desired, in accordance with the invention.

FIG. 7 illustrates averaging which may be performed, but need not be, in the practice of the present invention. Therein, a first array identified by k contains all of the data (e.g., either outside radii or wall thicknesses), for each site of a particular slice, the data in the first array being identified for values of k from 1 to 500. This data is transferred into a second array, modulo 500, with the data values corresponding to k, so that data values for K between 1 and 500 equal the corresponding data values for k equal to 1–500; values of K between 501 and 506 equal the data values of k between 1 and 6. Then, seven of the data values, beginning with the data value for K=4 and the three data values on either side thereof, are multiplied by word of weighting factors, W, the data values of which are equal to $\frac{1}{4}$, 2/4, $\frac{3}{4}$, 4/4, 2/4, and $\frac{1}{4}$ respectively. This provides a weighted summation in which the data for K=4 has the greatest weight, and trailing off on either side thereof. Dividing this by four will normalize it. An equivalent alternative is to use Values of 1/16, 2/16, 3/16, 4/16, etc., thereby obviating the need to divide by four. And then the result can be restored to the storage location where the averaged data value for k=4 appears in the original array. Then, in a second cycle, the word of weighting factors, W, can be multiplied against the seven data values centered around K=5, the result divided by four, and stored in the location of k=5. In a like manner, the process can proceed until the word, W, is multiplied against the data values centered around K=503, the result divided by four and stored in the storage location for k=3. Details of this nature are not important to the invention.

Figure 8:
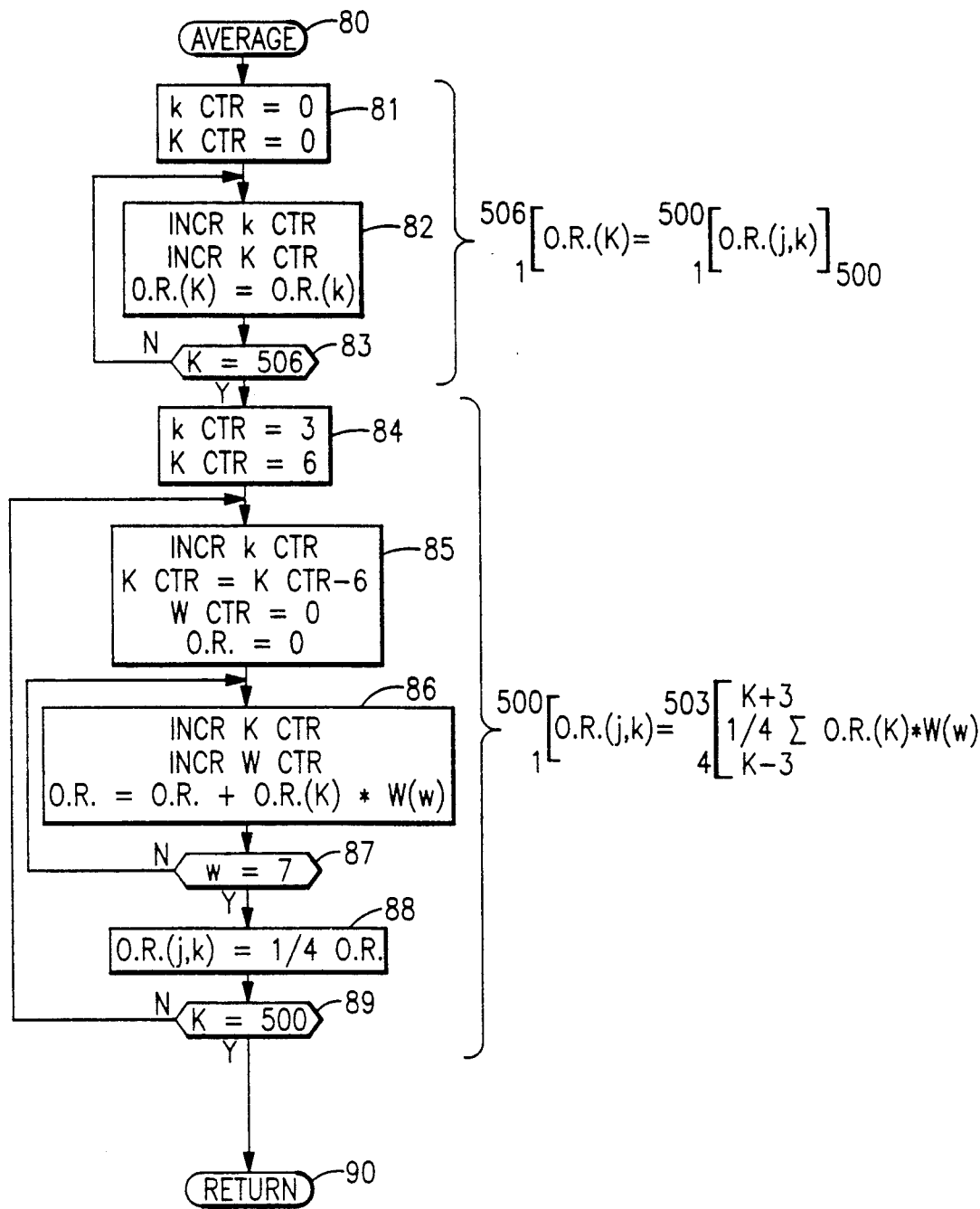
FIG. 8 is a logic flow diagram of final calculations, including least squares fitting and coordinate conversion, in accordance with the present invention.

The weighted averaging illustrated generally in FIG. 7 can be achieved, if desired, utilizing an average subroutine reached in FIG. 8 through a transfer point 80. The first set of steps and tests 81–83 create the second array identified with values of K in response to the first array identified by k, modulo 500 (which means that the k counter advances from 500 to 001). In steps 81, the k counter and the K counter are both restored to zero. Then in steps 82, both counters are incremented so as to point to the first location each array. Then, the outside radius in the array K is made equal to the outside radius in the array k. A test 83 determines when K has reached 506; when it has not, a negative result causes the program to revert to the steps 82 to move the next value of outside radius to the second array.

When all of the values of the first array identified by k have been moved into the second array identified by K, an affirmative result of the test 83 will reach a pair of steps 84 where the k counter is set equal to three and the K counter is set equal to six. This is an initialization process that will cause the first multiplication of the weighted word, W, to be against the seven data values centered around the value of K=4, in the steps 85. First, the k counter is incremented to point to the location for the first result to be achieved, k=4. Then the K counter is reduced by five so that it will point to the first part of the second array where multiplication is to begin, in this case, K=1. A w counter is initialized at zero so as to permit stepping through the word of weighting factors, W, and an outside radius working register is initialized at zero. Then, in a series of steps 86, the K counter is incremented so as to initially point to one, the w counter is incremented so as to point to one, and the value of outside radius has added to itself the value of outside radius in the second array identified by K (in the first instance K=1) multiplied by the weighting factor pointed to by the w counter, in the first instance the first value thereof (¼). Then a test 87 determines if all weighting factors have been multiplied or not. Initially they will not, so the steps 86 are reverted to where the K counter is again incremented to point to the second data value in the array and the w counter is incremented so as to point to the second weighting factor in the word, W. The process repeats until all seven values of outside radius centered around K=4 have been multiplied by the weighting factors of word, W. Then an affirmative result of the test 87 will reach a step 88 where the result if divided by four and placed in the kth storage location relating to the jth slice, as illustrated in FIG. 7. A test 89 determines if all 500 values of outside radius for this particular slice have been averaged or not. If not, a negative result of the test 89 causes the program to revert to the steps 85 where the k counter is incremented so as to point to the storage location identified by k=5. The K counter is decremented by five (having been left on seven this will cause it to reach K=1), the w counter is restored to zero, and the O. R. working register is restored to zero. Then the K counter is incremented so as to point to K=2, the w counter is incremented so as to point to w=1, and the O.R. working register has added to itself the value of outside radius in K=2 times the weighting factor for w=1 (¼). In the same fashion, the process repeats until, in a 500th cycle, the data value in K=503 (which is the same as the original data value in the k=3) is averaged with the three data values on either side thereof and the result placed in k=3. At this point, test 89 will be affirmative causing the program to revert to the test 68 in FIG. 6, through a return point 90.

The disclosed embodiment utilizes many detailed ultrasonic and signal processing steps which are disclosed and claimed in a commonly owned, copending U.S. patent application of Reed, entitled "Processing Ultrasonic Measurements of a Rotating Hollow Workpiece", filed contemporaneously herewith. The illustration herein of said detailed processing steps are exemplary merely, and similar processes may be performed with somewhat different sequences and utilizing different numbers. Furthermore, the cavity axis coalignment herein is not dependent upon how the information concerning the cavity axis is derived. The use of ultrasonic measurements is only one manner of implementing the invention, which is presently believed to be the best manner. However, the invention may be practiced using other non-contact or contact measurements, if deemed suitable in any particular utilization of the invention.

When utilizing ultrasonic measurements, the processing can be significantly different if desired. For instance, if suitably large and fast signal processing and computing equipment is available, the time constraints on the processing can be limited essentially to the time required to receive discernible ultrasonic echoes, with the processing of the data for each slice being accomplished in a different manner. Similarly, if ornate rotary encoders are utilized, all but the final processing may occur either partially or totally in parallel with the data collection. Similarly, there are any number of processing details which may be different from the exemplary embodiment herein.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of positioning a hollow workpiece to align the average axis of its internal cavity with the rotational axis of a workpiece-rotating machine tool, comprising:

providing a plurality of sets of signals, each set corresponding to a related one of a succession of positions longitudinally displaced along the internal cavity, each set including a plurality of internal radius signals indicative of the distance between said rotational axis and the inner surface of said cavity at one of a succession of sites circumventing the workpiece;

providing a plurality of line axis signals together indicative of a line representing a least squares fit to the centroids of all of the areas about said rotational axis circumscribed by the distances indicated by said internal radius signals at each of the positions; and positioning each end of said workpiece in the workpiece-rotating machine with its ends offset from said rotational axis so as to coalign the average axis of said cavity indicated by said line signals with said rotational axis.

2. A method of positioning a hollow workpiece to align the average axis of its internal cavity with the rotational axis of a workpiece-rotating machine tool, comprising:

a) providing a plurality of sets of signals, each set corresponding to a related one of a succession of positions longitudinally displaced along the internal cavity, each set including a plurality of internal radius signals indicative of the distance between said rotational axis and the inner surface of said cavity at one of a succession of sites circumventing the workpiece;

b) providing, in response to each of said internal radius signals, a pair of orthogonal site signals together indicative of the orthogonal site coordinates of the distal end of a radial line emanating from said rotational axis of a length indicated by said internal radius signal at the angle about said axis which said related site bears to an arbitrary reference site;

c) providing, in response to said orthogonal site signals of each of said sets, first and second orthogonal centroid signals together indicative of the orthogonal coordinates of the centroid of all of said orthogonal site coordinates of the related set;

d) providing, in response to all of said first orthogonal centroid signals, a first set of line signals indicative of a first line representing the least squares fit to the values represented by said first orthogonal centroid signals;

e) providing, in response to all of said second orthogonal centroid signals, a second set of line signals indicative of a second line representing the least squares fit to the values represented by said second orthogonal centroid signals;

f) providing, in response to said first and second sets of line signals, offset signals indicative of the positions of the end points of a line defined by said line signals extended to the ends of said workpiece; and g) positioning each end of said workpiece in the workpiece-rotating machine to coalign the line represented by said line signals with said rotational axis, as indicated by said offset signals.

3. A method according to claim 2 wherein steps f) and g) comprise:

h) providing, in response to said first and second sets of line signals, end signals indicative of the orthogonal coordinates of the end points of a line defined by said line signals extended to the ends of said workpiece;

i) providing, in response to said end signals, sets of offset signals indicative of the respective polar coordinates of said end points; and j) positioning each end of said workpiece in the workpiece-rotating machine, by distances and angles with respect to said angle of said arbitrary reference site, indicated by said offset signals.

4. A method according to claim 2 wherein said step c) comprises providing each of said first orthogonal centroid signals as twice the summation of all of a first one of each pair of orthogonal site coordinates of the related set, and providing each of said second orthogonal centroid signals as twice the summation of all of the second one of each pair of orthogonal site coordinates of the related set.

5. A method according to claim 2 wherein said step a) comprises providing said internal radius signals in response to processing echoes from ultrasonic pulses directed toward said workpiece.

6. A method according to claim 2 wherein said step a) comprises providing a plurality of pairs of signals, each pair corresponding to a related one of said sites, each pair including a wall thickness signal indicative of the thickness of the wall of the workpiece at the related site and an outside radius signal indicative of the distance between the rotational axis of the machine tool and the outer surface of said workpiece at said related site, and providing each of said internal radius signals in response to the difference between said distance and said thickness indicated by the corresponding one of said pairs of signals.

7. A method according to claim 6 wherein said wall thickness signals and said outside radius signals are provided in response to processing echoes from ultrasonic pulses directed toward said workpiece.

* * * * *